April 28, 1970     D. GABOR     3,509,276
PHOTO-ELECTRONIC IMAGING APPARATUS
Filed June 7, 1967     3 Sheets-Sheet 1
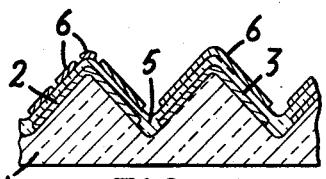
FIG. 1A
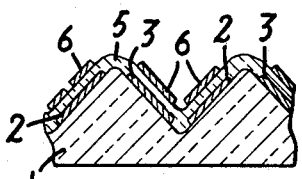
FIG. 2A
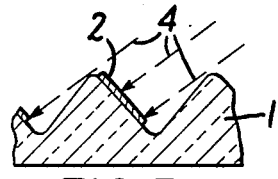
FIG. 3A
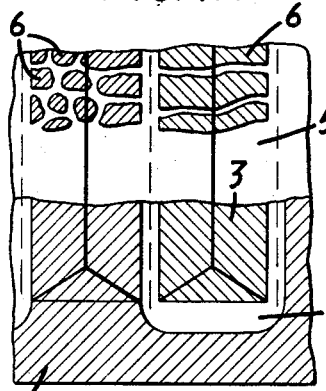
FIG. 1B
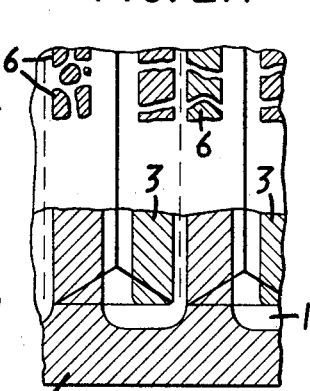
FIG. 2B
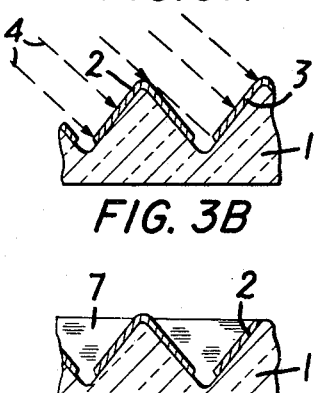
FIG. 3B
FIG. 3C
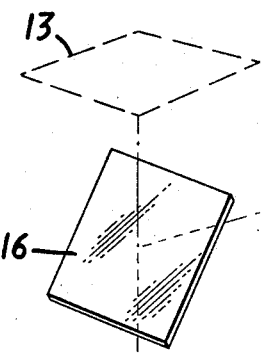
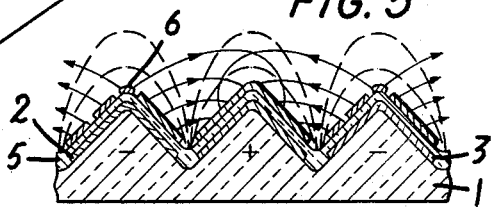
FIG. 5
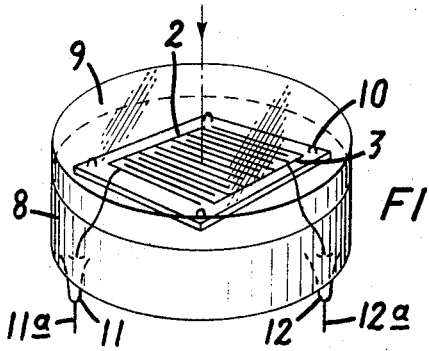
FIG. 4
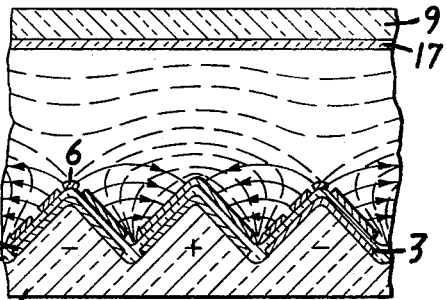
FIG. 6
INVENTOR.
DENNIS GABOR
BY
his ATTORNEYS April 28, 1970   D. GABOR   3,509,276
PHOTO-ELECTRONIC IMAGING APPARATUS
Filed June 7, 1967   3 Sheets-Sheet 2

INVENTOR.
DENNIS GABOR
BY
Brumbaugh, Free, Graves & Donohue
his ATTORNEYS

April 28, 1970  D. GABOR  3,509,276
PHOTO-ELECTRONIC IMAGING APPARATUS
Filed June 7, 1967  3 Sheets-Sheet 3
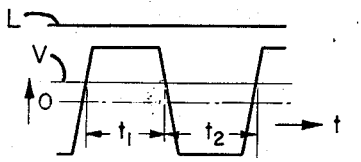
FIG. 9A
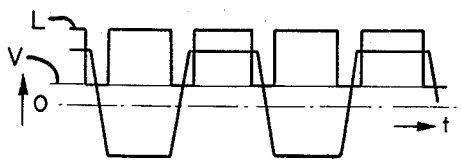
FIG. 9B
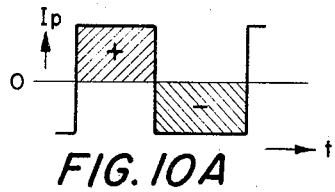
FIG. 10A
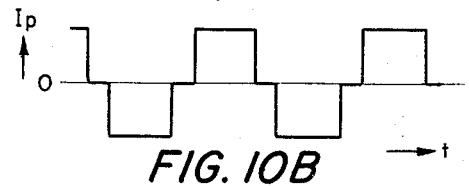
FIG. 10B
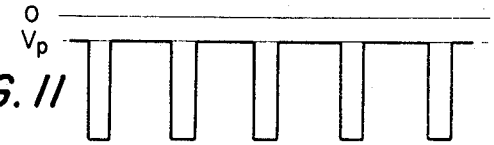
FIG. 11
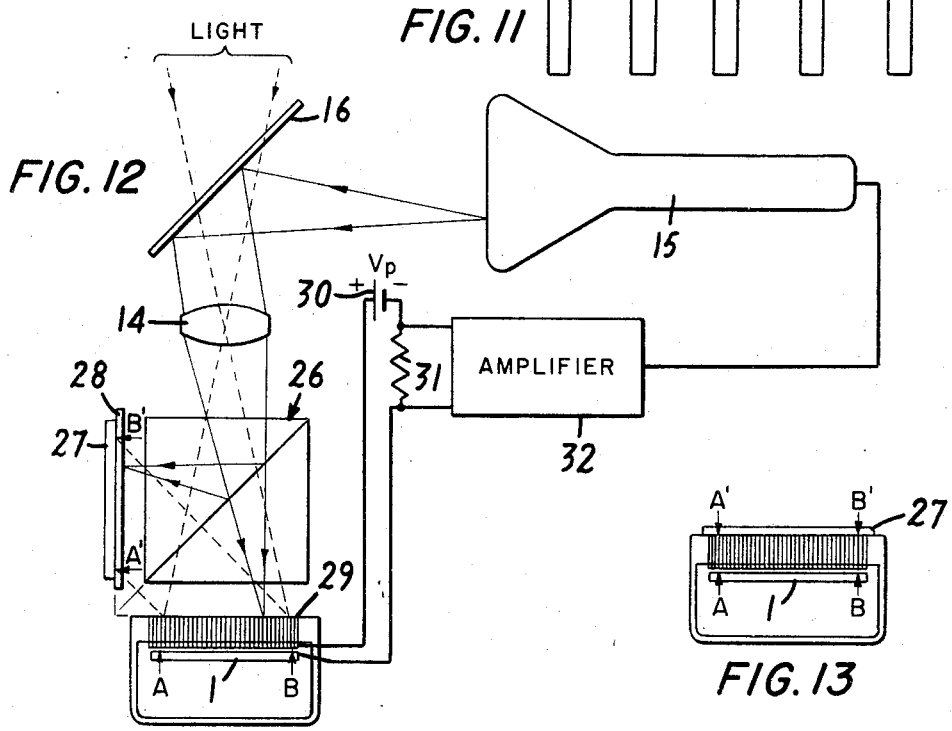
FIG. 12
FIG. 13
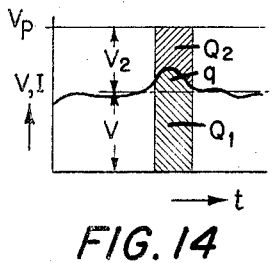
FIG. 14
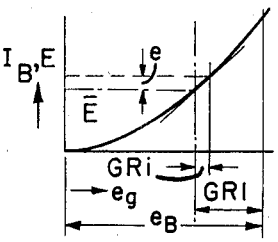
FIG. 15
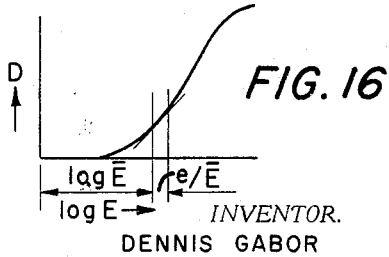
FIG. 16
INVENTOR.
DENNIS GABOR
BY
his ATTORNEYS United States Patent Office 3,509,276
Patented Apr. 28, 1970

3,509,276
PHOTO-ELECTRONIC IMAGING APPARATUS
Dennis Gabor, London, England, assignor to Columbia Broadcasting Systems, Inc., New York, N.Y., a corporation of New York
Filed June 7, 1967, Ser. No. 644,248
Claims priority, application Great Britain, June 15, 1966, 26,743/66
Int. Cl. H04n 3/14, 5/30
U.S. Cl. 178—6.8                                    6 Claims

ABSTRACT OF THE DISCLOSURE

In the particular embodiments of the invention described herein, a frequency selective photo-electronic image transducer includes an insulating plate having minute closely spaced prismatic ridges, the surfaces of which are covered with a capacitative sandwich structure comprising an electrode coated on the plate, an insulating layer and a photo-emissive material at the outer surface, the latter being in the form of a mosaic of isolated elements. The electrodes on alternate ridges, or in another form on corresponding sides of every ridge, are connected together and to an alternating potential source operating at the desired frequency of selection, the other electrodes being grounded. An illuminated object containing light modulated with information at the selected frequency is imaged onto the surface of the plate intermittently and, between exposures, a line scan tube image onto the surface reads out the charge accumulated at the various elemental areas in succession. The frequency-selected image is then reproduced on a display tube. In an alternative embodiment, light from an image of the object is conveyed to the photo-sensitive plate by a fiber-optics array and a mask is provided to compensate for inequalities in the sensitivities of the photo-emissive elements.

BACKGROUND OF THE INVENTION

This invention relates to photo-electronic imaging devices or cameras and, more particularly, to a new and improved photo-electronic imaging apparatus arranged to transduce only a selected modulation frequency component of an illuminated image into an electronic image.

Although tuned photo-electronic devices have been known and used for a long time, images could heretofore be produced with them only by scanning the original optical image as the number of individual cells required for forming a detailed image has been prohibitive. The problem of picking out a weak, high-frequency modulated image from a strong background arises in particular in the case of my previous United Kingdom provisional patent applications 20,025/65 of May 12 and 28,771/65 of July 7. The said applications relate to a device in which minute vibrations of a reflecting screen, and the ultrasonic image formed thereon, are made visible by the modulation of the reflected light with the ultrasonic frequency, which is in the megacycle range. The modulated part of the amplitude in the said device may be a hundred or more times weaker than the unmodulated part, and is detected by one or several photosensors, each with an amplifier tuned to the ultrasonic frequency, which scan an image of the vibrating screen in order to form a complete image.

SUMMARY OF THE INVENTION

In the present invention the high-frequency modulated image is picked up as a whole by a novel photo-electronic camera, which is insensitive to steady or "D.C." illumination, but highly sensitive to light modulated with a certain frequency. The principal organ of this camera is a screen which consists of two separate groups of elementary photo-emitters, interlaced with one another in a symmetrical arrangement. Each group contains a number of elementary photo-emitters at least equal in number to the picture elements to be resolved. Each group is capacitatively coupled to a separate signal electrode, and the two signal electrodes are also interlaced with one another.

In one form of the invention, the photo-emitters are arranged on prismatic ridges of an insulating common base plate, so that each element faces the incident light and also at least one element of the opposite group, so that these opposite elements can exchange photo-electrons with one another. This form has the advantage that there is no loss of electrons by interchange other than between opposite ridges, but it is understood that a form in which all the electrodes are disposed in the same plane may be preferable because of its simplicity.

The operating cycle of this device consists of a recording phase and of a reading phase, which may be repeated in alternation. In the recording phase an image is formed on the screen with the partially modulated light, and an alternating voltage of the same frequency as the one to be picked up is applied to the two interlaced signal electrodes, and thereby, capacitively also to the photo-electric elements. As the two groups are perfectly symmetrical, in the case of steady, unmodulated illumination the two groups of photo-electric elements merely exchange photoelectrons with one another, in equal numbers. When an element is negative, it emits as many electrons to its positive neighbors as it receives from them in the next half-cycle, when the polarities are reversed, hence the potentials of the elements oscillate around the same mean potential. If, however, the incident light is modulated with the same frequency, unless the light and the alternating voltage happen to be in quadrature, an element which is negative in the half-cycle in which the light is a maximum will emit more electrons than it will receive in the next half-cycle, when the light is a minimum. Consequently, it will steadily lose electrons and will assume gradually a positive potential with respect to its neighbors.

In the reading phase the incident light is switched off or obscured by a shutter, and the elements retain their different potentials which they have acquired during the recording phase. They are discharged by a reading light spot, for instance, by the light spot of a flying-spot cathode ray tube, which scans them in succession. Each positive element receives photoelectrons from its negative neighbors, until all potentials are equalized. During the discharge of these elements, charges are exchanged also between the two signal electrodes to which the photo-electric elements are capacitively coupled. The discharge of the said signal electrodes is effected through the input impedance of an amplifier. After amplification the signals are two-way rectified, because both positive and negative pulses indicate the same high-frequency light amplitudes, and the rectified signal is displayed on a cathode ray tube, whose scan is coupled to that of the flying-spot tube.

The system as described fails to record an oscillating component of the light only if this happens to be in quadrature with the applied H.F. voltage. In a form of the invention this is remedied by shifting the phase of the alternating voltage by a quarter cycle in alternate recordings. This is not necessary in applications in which the phase of the light fluctuations is known, for instance, if the light modulation is effected at the light source and not at a vibrating screen.

BRIEF DESCRIPTION OF THE DRAWINGS

In order to make the device as sensitive as possible to light fluctuating at a certain frequency but as insensitive is possible to other frequencies, in particular to steady light, various means will be described which will be best understood by means of the accompanying drawings:

FIG. 1A is a cross section and 1B a plan view of a small part of one form of photo-electric screen according to the invention, in which the signal electrodes are roof-shaped.

FIGS. 2A and 2B are corresponding illustrations of a screen in which each ridge carries two signal electrodes.

FIGS. 3A–3C explain stages in the manufacture of the said screens.

FIG. 4 is an illustration of the device according to the invention with its optical accessories and the flying spot cathode ray tube.

FIG. 5 illustrates the electric fields and electron trajectories in the operation of a device of the type as shown in FIG. 1. FIG. 6 is a corresponding illustration with a negative field superposed.

FIG. 8A shows the light intensities falling on the screen as a function of time; 8B shows the high-frequency alternating voltage; 8C the capacitive current; 8D the photocurrent emitted and collected by an elementary area of the screen; 8E the charge and voltage accumulating during the recording phase and its discharge during the reading phase.

FIG. 9A is a diagrammatic illustration of the limitation to the charge build-up on the screen; 9B shows this limitation overcome by one or the other of the means illustrated in FIGS. 9 and 11. FIG. 10A shows the inequality of positive and negative charges which arise in the absence of precautions; 10B their equality if the light is suppressed during the time of the voltage rise. FIG. 11 illustrates achieving the same effect by suppressor voltage peaks applied to an electrode facing the screen.

FIG. 12 illustrates a method for producing a photographic mask which compensates the effects of unequal photo-electric yield in different elementary areas of the screen. FIG. 13 shows the said mask applied to the device.

FIGS. 14–16 are diagrams explaining the compensation effect achieved by the arrangement shown in FIG. 12. FIG. 14 illustrates the unequal currents and voltages arising by differences in the photo-electric yield of various elementary areas. FIG. 15 is the beam-current vs. grid voltage characteristic of the flying-spot cathode ray tube, explaining the application of the said signals for varying the beam current and thereby the exposure of the photographic mask. FIG. 16 illustrates the density vs. exposure characteristic of the photographic plate used as a compensating mask.

DESCRIPTION OF THE PREFERRED EMBODIMENTS

Figure 7:
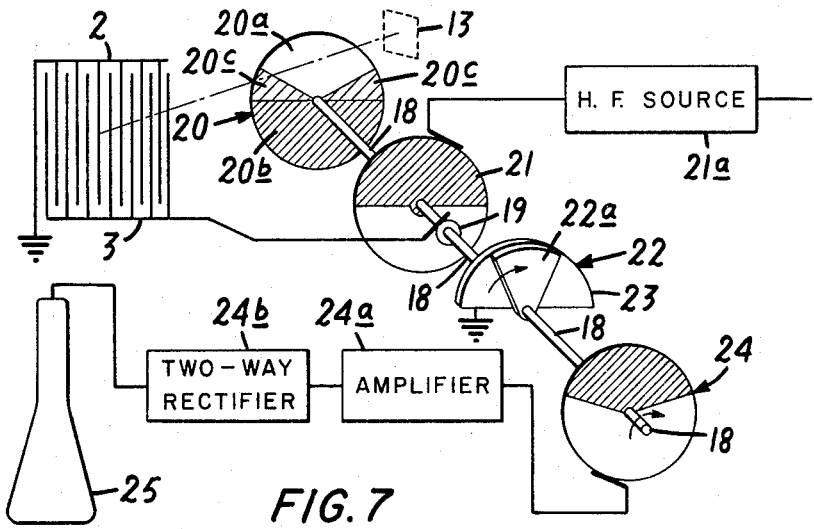
FIG. 7 is a schematic illustration of the electrical and mechanical accessories of the invention.

FIG. 1A is a greatly enlarged cross section of one embodiment of a photo-electric screen according to the invention. The base 1 of this screen is a plate of insulating material, for instance, glass, which is grooved with triangular grooves, with angles preferably in the range 60–90°. The resolution limit of such a screen is equal to one groove period, hence the number of the grooves or ridges must be equal to or larger than the number of resolvable lines. For instance, if a definition of 500 is required, the number of ridges must be 500 or more. These can be arranged, for instance, in a square of 50 x 50 mm., so that the width of a screen period is 0.1 mm. The base plate can be formed either directly by engraving with a diamond tool, or by molding on a plate of stainless steel or the like, similarly engraved. In the reading process it is preferable to scan the ridges at right angles instead of parallel to them, to avoid moiré effects.

An interlaced system of the two signal electrodes 2 and 3 is next applied to the base, in such a way that they remain separated at the bottom of the valleys. A convenient way of achieving this is illustrated in FIGS. 3A and 3B. The ridges are coated with evaporated metal, such as nichrome or the like, by means of vapor jets in vacuo 4, so directed that the bottom of the valley is shadowed by the next ridge. Two such coatings, in opposite directions, produce a roof on each ridge. Outside the ridge system the metal coating is applied in such a way that all odd signal electrodes are connected at one end, the even ones at the other, so that the two electrodes form two interlaced combs. This can be achieved, for instance, by coating the surfaces which must remain clean with a photo-resist, which is dissolved after the metal spray, by methods well known in the art.

Next the whole surface is coated with a thin layer 5 of an insulating substance, such as for instance a mixture of silicon monoxide and dioxide. It is advantageous to use an insulator such that its time constant is of the order of a few seconds or minutes, which is large enough compared with the operating cycle, but short enough to prevent the long-term accumulation of charges. On top of this is applied a photo-electric mosaic, by methods well known in the art. This can be produced, for instance, by evaporating on top of the insulator 5, again by inclined vapor jets, a layer 6 of a metal such as silver, which will crackle on the insulator, either into very small units as shown at the left-hand side of FIG. 1B, or at least crosswise to the ridges, as shown at the right-hand side. It is sufficient to have one crack per ridge period to make the definitions equal in the two directions at right angles to one another. This mosaic is then coated by evaporation with photo-electric emitting substances, such as caesium. Another method, also well known in the art, is to deposit on the insulator small globules of silver, oxidize these, and caesiate them.

FIGS. 2A and 2B illustrate another type of a screen, in which each ridge carries on its two sides coatings corresponding to opposite signal electrodes. This type has potentially a definition equal to twice the groove number. The separation of the two electrodes at the bottom of the valleys is effected as before, by inclined vapor jets, but they must be now separated also at the top. This may be effected, as shown in FIG. 3C by filling the grooves with an acid-resisting substance 7, such as paraffin, and scraping this off the tops of the ridges with an elastic tool, for instance, with a plastic strip. The bare top of the conductor is then dissolved in an acid. The procedure may be repeated with the layer 6, but if the photoelectric mosaic is produced in the form of small silver globules, this is not necessary, as these are sufficiently insulated from one another. Producing the connections at the ends is somewhat easier in the case of this type than in the case of the roof-shaped, alternating signal electrodes shown in FIGS. 1A and 1B. It is sufficient to cover up the two ends alternatingly when applying the vapor jets as shown in FIGS. 3A and 3B, and then evaporate a strip over each end, or to use a conducting strip-coating previously applied.

The plane variety of photoelectric screen according to the invention can be completely produced by first evaporating the electrodes 2, 3 through suitable masks onto a planar insulating surface, then applying a layer of insulating material such as silicon monoxide, then evaporating antimony through the same masks along with a fine mesh screen to break the layer into islands, and finally caesiating the antimony surface.

FIG. 4 shows schematically the complete device. The screen is enclosed in a vacuum envelope 8, with a plane-polished glass top 9, preferably at a small distance from it, which is secured by small projections 10. As a caesiated screen cannot be exposed to air, and the small distance between the screen and the cover plate 9 is too small for caesiation, one way of producing this device is the method known in the art as "cathode transfer," in vacuo. Alternatively, the screen is sealed into the device before caesiation and is exposed to caesium vapor inside the envelope 9, but in a position sufficiently remote from the plate 9, and is then moved into position, for instance, by releasing springs which press it against the plate. The two signal electrodes are led out through seals 11, 12, to which they are connected with flexible leads 11a and 12a.

The reference numeral 13 indicates the area which is to be imaged on the screen, by light partially modulated with a high frequency. The image is formed by a lens 14. The same lens images also the face of the flying spot cathode ray tube 15 by means of the semi-reflecting plane mirror 16. It may be noted that if the image of 13 is formed with polarized light, as in the case of laser illumination, the semi-reflecting mirror can be replaced by a so-called "Brewster-angle prism" which transmits light polarized in a certain plane practically without loss, while it almost completely reflects light polarized at right angles to that plane. There is, therefore, no need to lose one-half of the light coming from 13.

The operation of this equipment is explained in the following figures. FIG. 5 is a diagrammatical cross section of a screen of the type as in FIG. 1, showing the equipotential lines in dotted lines and the trajectories of the photoelectrons in continuous lines. It is assumed that the potential of the top plate 9 is equal to the mean potenial midway between the potentials of the positive and negative elements. It is seen that practically all the electrons starting from a negative element end on its positive neighbors, but the distribution of the electrons collected differs somewhat from that of the electrons emitted. There is also the possibility of some electrons of appreciable initial velocity escaping and landing on the face of the plate 9. This, however, would soon charge itself up to such a negative potential as to prevent further escapes.

In FIGURE 6 this effect is utilized and improved by fitting the inner face of the plate 9 with a transparent conducting layer 17, and giving this a potential negative with respect to the mean potential of the photoelectric elements. In this case, a third lead, not shown in FIG. 4, is connected with the transparent conducting coating on the inside of the plate 9 for connection to an external voltage source. By this the trajectories are depressed, so that they land on the face opposite to them. This depressing gradient is particularly useful in the case of screens of the type shown in FIGS. 2A and 2B, in which each face has to exchange electrons with its next neighbor only. But it is also effective with the plane arrangement. An insulating instead of conducting face opposite the screen is also effective, because it will charge itself up by photoelectrons to a little below the potential of the negative maximum of the opposing area of the screen, and this too will be effective in directing the photoelectrons to the next positive neighbor.

FIG. 7 is an illustration of the device, which is schematically represented by its interlaced signal-electrodes 2 and 3, together with its associated electrical and mechanical equipment. It is understood that several components in the mechanical equipment can be replaced by electronic equivalents, as well known in the art.

A shaft 18 is driven by a motor (not shown) with, for instance, 25 revolutions per second, so as to produce 25 operation cycles per sec. For simplicity one of the two signal electrodes 2 is shown earthed while the other 3, is connected with the shaft 18 by a slipring 19. A continuation of the shaft 18 carries a disc 20, which is transparent on, for instance, a ⅓ portion 20a of its periphery, dark on a ½ portion 20b of it, and has a gradual transition between dark and transparent on two segments 20c of 1/12 each. It is understood that this rotating disc can be replaced by electronic means of light modulation, such as Kerr-cells or Faraday effect devices, so long as the same purpose is served, that is to say, exposing the screen to the recording light from the area 13 to be recorded during a fraction of the cycle, and obscuring it during another fraction, with a gradual transition between the two.

The shaft 18 carries also a rotating switch in the form of a disc 21, which establishes connection between a high frequency power source 21a and the signal electrode 3 during the time in which the screen sees the image to be recorded, and switches it off afterwards abruptly or preferably gradually. The same shaft carries also one or several sectors of a rotary condenser 22, formed here by the rotating sector 22a and the stationary sector 23. It is seen that this capacitor, which is in parallel with the signal electrodes 2–3 has a large capacitance during the recording period, which then drops to a very small value, and maintains the small value during the read-out period. The purpose of this variable capacitance will be explained later.

During the read-out period the signal electrode 3 is connected by means of a rotary switch 24 to an amplifier 24a, followed by a two-way rectifier 24b which modulates the display tube 25. Another similar switch (not shown) puts the flying spot tube 15 into operation. The scan begins when the capacitance 22 has dropped to its lowest value and ends when this begins to rise again. It is understood that the display tube 25 can be of the "memory" type, in which case the scanning cycle need not be repeated.

Figure 8:
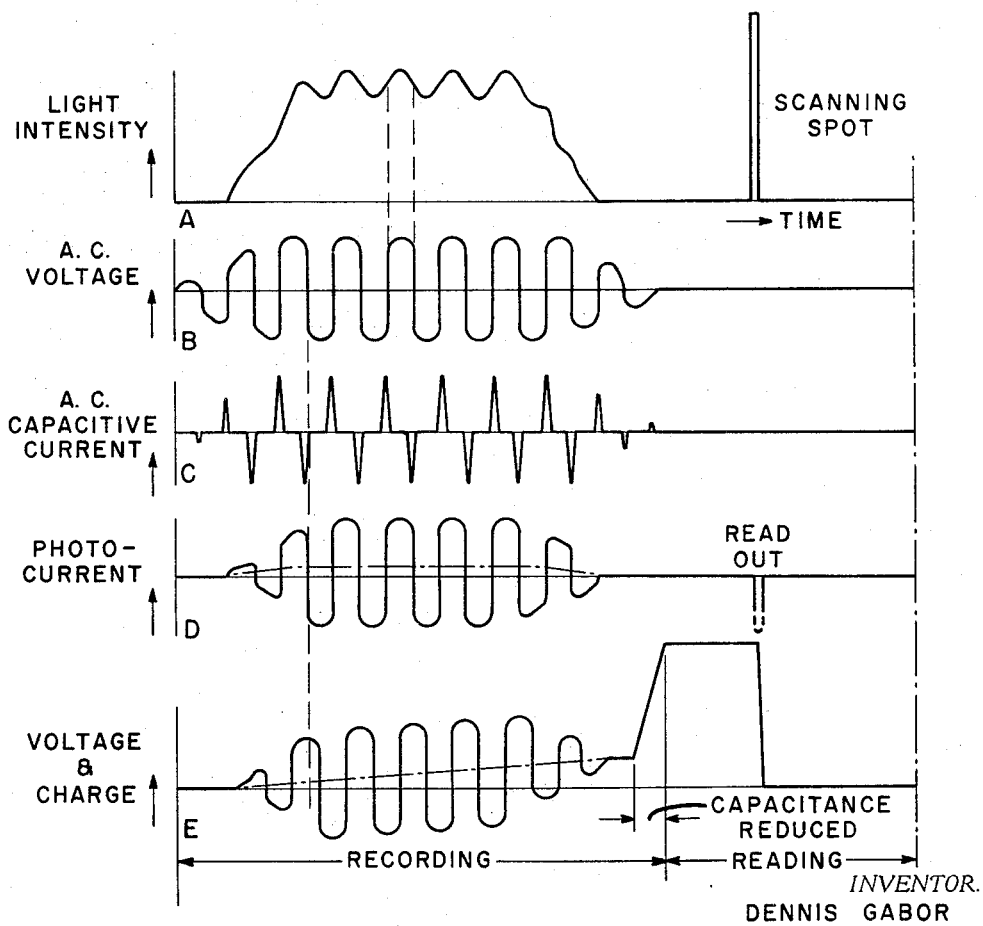
FIG. 8 is a diagrammatic illustration of the operating cycle of the invention.

FIGS. 8A–8E explain the operation by means of timing diagrams. The first of these, FIG. 8A, shows the fading in and fading out of the image-forming light by the disc 20 or its equivalent. In order to show the operation clearly the time scale is strongly compressed; on the other hand the modulation depth of the light is strongly exaggerated. In a typical case, which may be used in the numerical examples below, the amplitude of the alternating part of the light intensity may be $\frac{1}{100}$ of the D.C. component of the light, or even less. On the other hand, a typical value of the frequency is 3 megacycles, while the cycle length may be 40 milliseconds, corresponding to 25 pictures per second. There will be, therefore, 60,000 oscillations during the half-cycle in which the area 13 is exposed to the photosensitive surface, of which for instance 40,000 may be with full intensity, and 10,000 each for the phases of fading in and fading out. The scanning spot from the tube 15 is short and sharp; it falls on one element of a screen with a definition of 500 x 500, scanned during, say, 15 milliseconds for 0.06 microsecond only, and must be of sufficient intensity to discharge it completely. The video amplifier must have in this case a bandwidth of about 8 megacycles.

FIG. 8B shows the high frequency voltage applied between the two signal electrodes during the phase when the light is on, or a little longer. It has preferably a very sharp rise, and can be, but need not be, flat-topped. The reason for this will be explained later. The amplitude must be large enough to ensure that during almost all the time the saturation photocurrent is drawn from the photo-emitters, and not a space-charge limited current. With the small spacing of the elementary areas, as previously indicated of the order of 0.1 mm. and at the usual level of illumination $\frac{1}{100}$ volt is sufficient to draw saturated photocurrents, hence an amplitude level of a few volts is sufficient.

The H.F. oscillator has to supply a predominantly capacitive current, of the shape as indicated in FIG. 8C. The capacitance between the two signal electrodes of a screen of the type as shown in FIG. 1A is about 1000 pf. For reasons to be explained later it is expedient to put in parallel to this a larger capacitance, perhaps ten times larger, i.e., 0.01 μf. Assuming a frequency of 10 megacycles, with voltage rise times of $10^{-2}$ μsec., i.e., about $\frac{1}{30}$ of the cycle, the peak currents are 1 amp. for volt amplitude. The H.F. oscillator must, therefore, supply a few voltamperes.

The photocurrents drawn from one elementary area of the screen are shown in FIG. 8D on a much enlarged scale relative to that in 8C. Under the conditions stated, that is to say saturation current flowing during almost all the time, in one direction or the other, the photocurrent is proportional to the illumination, with signs reversed in alternate half-cycles. In the example shown, a larger electron current is drawn from the elementary area in positive half cycles of the voltage than in the negative ones, hence the mean of the photocurrent is positive, as shown in a dotted line. In the read-out the discharge current is negative, that is to say this area will receive as many electrons as it has lost in the recording phase.

FIG. 8E shows the voltage on the same area, which is also the graph of its charge, as the two are proportional to one another. The voltage and charge curve is shifted by a quarter cycle relative to the current curve in FIG. 8D, and its mean is rising steadily during the recording phase. The final level remains constant, after the illumination is extinguished until the area is discharged by the reading spot. But it is expedient to reduce the capacitance in parallel to that of the screen before the reading phase starts, by means such as shown in FIG. 7. If, for instance, the external capacitance 22 is ten times larger than the capacitance of the screen electrodes, and the capacitance 22 is reduced to nil, the whole charge previously distributed between the external capacitance and the electrodes is now concentrated on the electrodes and the voltage, and consequently the signal energy available for the reading is now increased 11 times. The accuracy of charge equalization is also improved by the increased potentials.

FIGS. 9–11 are further diagrammatic explanations of this process and of means by which it can be further improved. FIG. 9A illustrates an effect of the large D.C. illumination added to the relatively weak modulated component, which tends to counteract the previously explained operation of the invention. L is the illumination level, which is shown as steady; the small oscillating component has been left out to clarify the explanation. V is the potential of an elementary area relative to its neighbor with which it exchanges electrons. It is assumed that this area has lost more electrons than it has collected, hence its potential, shown as the level O, is positive. This potential is subtracted from the A.C. potential, hence the said area will be able to emit electrons only during the shorter time $t_1$ and will collect electrons during the longer time $t_2$. But if the A.C. modulated light amplitude is only 1/100 of the D.C. light, and excess of $t_2$ over $t_1$ of 1/100 will be sufficient to arrest the charge accumulation. This undesirable effect, which limits the obtainable signal powers, is reduced by operating with very steep voltage rises; it is also reduced by the external capacity 22 which reduces the potential differences arising between the elementary areas of the screen, but it cannot be reduced to zero. FIG. 9B illustrates a method by which it can be reduced to almost nil. This consists in shutting off the illumination L during the periods in which the voltage changes sign, and admitting light only during the flat-topped phases of the voltage cycle. The effect of this is shown in FIGS. 10A and 10B While in FIG. 10A, which corresponds to FIG. 9A, the photocurrents $I_p$ emitted and collected are unequal, in FIG. 10B, which corresponds to FIG. 9B, they are equal. Such sharp shuttering can be effected, preferably at the light source itself, by means well known in the art, such as Kerr cells.

FIG. 11 illustrates another method for achieving the same effect. Sharp rectangular negative pulses are applied to the transparent conducting coating 17 of the plate 9 opposite the screen for suppressing all the photocurrents during the sign change of the A.C. voltage. As the capacitance of the layer 17 with respect to the screen is small, very sharp suppressing pulses can be obtained with small power. By means such as these it is possible to make the signal level O rise almost to the top level of the A.C. voltage amplitude, and by using a variable outer capacitance C, it is possible to make the final signal a multiple of it.

In the screen according to the invention large photocurrents are exchanged between opposite elementary areas, while only the small difference between these is available as a signal. This is a potential source of error, because it could happen that, when the light is shut off, the charge caused by the strong D.C. part of the light in a half-cycle remains behind, and this may be as much as the signal charge accumulated during several hundred cycles. This is not a large error, as the recording phase may extend, as in the previously mentioned example, to several ten thousand cycles. It can be further reduced, however, by increasing the illumination gradually at the beginning of the recording phase and decreasing it gradually at the end of it, as already shown in FIG. 8A. The theory shows that if these phases of gradual fading-in and fading-out extend each over X cycles, the maximum error is reduced by a factor of the order $1/X$.

A further error can arise by the unequal photoelectric sensitivity of opposing elementary areas. So far it has been assumed that at equal illumination and with symmetrical voltages these will exchange equal numbers of electrons. But if one area has a photoelectric yield 1% larger than its opposite, this might mask the effect of an alternating component in the light which is only 1% of the D.C. light level. This will produce a static pattern of irregular character, superposed on the image, and might create a serious disturbance. FIGS. 12–16 illustrate and explain the means by which this may be overcome.

The disturbance is compensated if an elementary area which has a photoelectric yield 1% larger than its opposites receives 1% less light. This is effected by a photographic compensating mask, produced by the method illustrated in FIG. 12. The optical arrangement is the same as in FIG. 4, but a further beam splitting prism 26 has been added, which produces a mirror image of the screen in the emulsion of a photographic plate 27. In order to make sure that the photographic plate is exactly in the plane of the mirror image, the following procedure is expedient. Four point-marks, of which two, A, B, are shown, are made in the four corners of the glass plate 1 which carries the screen, and a contact print of these is made on a photographic plate 28. The screen 1 is illuminated from below, and the plate 28 with its marks A', B', is viewed with a telescope from the right of the prism 26. The plate 28 is then moved until the marks A', B' exactly coincide with the mirror images of A, B. The photographic plate 27 is then placed in contact with 28. By the method to be described below this is then exposed so as to produce exact compensation. But unless the lens 14 has a very small aperture, which is not desirable, the compensating plate 28 could not be placed near enough to the screen to guarantee compensation in the smallest details because of the considerable thickness of the transparent plate 9. This is overcome, as shown in FIGS. 12 and 13, by using, in place of the plate 9, a fiber-optical screen 29, which transfers an image on its inner face to an almost exactly corresponding image on its outer face. If, therefore, as shown in FIG. 13, the exposed and processed compensating plate 27 is put in contact with and cemented to the fiber-optical screen 29, so that the marks A', B' which have been printed on the plate register with the images of A, B almost complete optical coincidence is ensured, because the distance between the inner face of the screen 29 and the screen 1 need be of the order of a few tenths of a millimeter only.

In the process of producing the compensator plate the two signal electrodes 2 and 3 of the screen are connected together, and a battery 30 providing a voltage $V_p$, positive with respect to these is connected between them and the conducting coating 17 of the plate 29. The photocurrent I is measured by the voltage drop RI in a resistor 31, as shown in FIG. 12. It is amplified by an amplifier 32 with a gain G and applied as a bias to the grid of the flying-spot tube 15.

The operation may be explained with the help of FIG. 14. The screen is uniformly illuminated with a short exposure from the area 13 through the disc 20 (FIG. 7), such that the photoelectric mosaic does not quite reach the level $V_p$ of the plate 29, but only to the mean level $V_1$, or somewhat below it. After this exposure the screen is scanned with the flying spot of the tube 15, with light strong enough to raise the potential of all elementary areas by an average rise $V_2$ to the datum level $V_p$.

If now a patch of the photoelectric surface is more sensitive than the average, it will rise in the first exposure a little higher than the mean potential $V_1$. It will discharge $Q_1+q$ electrons, and in the final discharge by the flying spot there remains only a smaller quantity $Q_2$ to discharge. The charges are illustrated in FIG. 14 by shaded areas.

The voltage drop RI across the resistor 31, amplified by the gain G of the amplifier 32 is applied to the grid of the flying spot tube 15 in a way illustrated in FIG. 15, that is to say, it is subtracted from grid bias $e_B$. The gun characteristic: beam current $I_B$ vs. grid voltage $eg$ gives at the same time the brightness of the spot, and multiplied by the time T during which it dwells on one point of the screen, it gives also the exposure E of the photographic plate 27. This may have the average value $\bar{E}$. If now, as in FIG. 14, the patch scanned at an instant has a smaller charge $q$ to discharge, I will be reduced by the amount $i$, corresponding to $q$, and the exposure of the photographic plate will rise by the amount $e$. Consequently, the photographic plate 27 will be a little more blackened at the point corresponding to a sensitive patch than in the average. This is shown quantitatively in FIG. 16, which is the Hurter-Driffield diagram of the photographic density D as a function of the logarithm of the exposure E.

It is clear that exact compensation of the excess sensitivity can be achieved by this process, if the quantities involved are appropriately chosen. The theory shows that the condition for this is $$\left(\frac{dD}{dE}\right)\left(\frac{dE}{de_g}\right) G \times R \times I_1 = 1$$

The first factor $dD/dE$ is determined by the photographic plate; it is the "gamma" of the plate, that is to say the slope of the Hurter and Driffield curve in FIG. 15 at the operating point, divided by the mean exposure $\bar{E}$. The second factor $dE/de_g$ is the slope of the $I_B$, $e_g$ characteristic of the electron gun of the flying spot tube 15, at the operating point. G is the gain of the amplifier, R its input impedance and $I_1$ is the current which would correspond to raising the screen potential by the flying spot by a step $V_1$. It is seen that there are five factors, all of which can be varied to achieve exact compensation. Experimentally the right conditions can be found by trial and error, until the D.C. output of the device is practically negligible and the background becomes uniform. In the production of the compensating mask it is expedient to make the scan finer than finally required, for instance, with 1000 lines instead of 500, because the smaller the elementary areas which are equalized, the better the result.

It is understood that a compensating mask can be applied, instead of at the screen itself, in any plane in which a real image of the screen is formed, but the method as described recommends itself by being free from the distortions which arise even with the best lenses in details as fine as here required.

Although the invention has been described herein with reference to specific embodiments, many modifications and variations therein will readily occur to those skilled in the art. For example, it may be used in connection with incoherent holography, where two images of an incoherently illuminated object produced with a mirror, for example, are permitted to interfere so that each point of the object is coherent only with its mirror image. When the mirror is vibrated, the coherent waves change phase to produce a large alternating component in the interference fringes, while the incoherent waves produce only a much smaller alternating component so that detection according to the invention at the frequency of vibration separates the coherent components. Also, by modulating the same light pattern with different information components at different frequencies, several types of information may be conveyed simultaneously. Accordingly, all such variations and modifications are included within the intended scope of the invention as defined by the following claims.

I claim:
1. Photoelectronic imaging apparatus comprising image recording means including an array of closely spaced interlaced flat electrode means supported on an insulating support, a thin layer of insulating material covering the electrode means, and a mosaic of electrically isolated closely spaced photoelectric elements disposed on the layer of insulating material, and alternating voltage supply means adapted to be connected to alternate electrode means in the interlaced grid to provide alternately opposite voltage relationships between adjacent electrode means of the grid at a selected frequency including shutter means for exposing an image on the image recording means intermittently, switch means for connecting the alternating voltage supply means to the alternate electrode means during each image exposure, and line scan tube means adapted to illuminate the image recording means element by element during intervals between the intermittent exposures.

2. Photoelectronic imaging apparatus according to claim 1 including display tube means and switch means for connecting the display tube means to the alternate electrode means during the intervals between intermittent exposures when the line scan tube means is scanning the image recording means.

3. Photoelectronic imaging apparatus according to claim 1 including variable capacitor means connected in parallel with the alternate electrode means and providing increased capacity during the image exposures and decreased capacity during the operation of the line scan tube means.

4. A method of detecting light modulations of a selected frequency in an image containing other illumination components comprising exposing the image to a mosaic of photo-emissive elements disposed in close proximity to an array of interlaced electrodes while applying voltage of the selected frequency to alternate electrodes of the array, and scanning the mosaic of elements with a spot of light while the alternate electrodes of the array are joined to an electronic image readout device.

5. A method according to claim 4 including the step of increasing the illumination of the image on the mosaic gradually at the beginning of the exposure and decreasing the illumination gradually at the end of the exposure.

6. A method according to claim 4 including the step of shutting off the image illumination during each change of sign of the alternating voltage applied to the alternate electrodes of the array.

References Cited
UNITED STATES PATENTS

| | | | |
|---|---|---|---|
| 2,899,488 | 8/1959 | Kalfaian | 178—5.4 |
| 3,011,019 | 11/1961 | Rado | 178—7.1 |

ROBERT L. GRIFFIN, Primary Examiner

H. W. BRITTON, Assistant Examiner

U.S. Cl. X.R.

96—27; 117—212; 178—7.1; 250—220